(12) United States Patent
Porotsky

(10) Patent No.: US 6,957,265 B2
(45) Date of Patent: Oct. 18, 2005

(54) QOS-SENSITIVE PATH SELECTION IN ATM NETWORK

(75) Inventor: Sergey Porotsky, Kiryat-Ono (IL)

(73) Assignee: ECI Telecom Ltd., Petach Tikva (IL)

( * ) Notice: Subject to any disclaimer, the term of this patent is extended or adjusted under 35 U.S.C. 154(b) by 738 days.

(21) Appl. No.: 09/944,104

(22) Filed: Sep. 4, 2001

(65) Prior Publication Data

US 2002/0049855 A1 Apr. 25, 2002

(30) Foreign Application Priority Data

Sep. 4, 2000 (IL) ................................................ 138236

(51) Int. Cl.[7] .............................................. G08C 15/00
(52) U.S. Cl. ........................ 709/231; 370/230; 370/235; 370/252
(58) Field of Search ................................. 370/230, 231, 370/232, 233, 234, 235, 252, 253, 238, 395.21–395.43; 709/238–241

(56) References Cited

U.S. PATENT DOCUMENTS

| | | | |
|---|---|---|---|
| 5,933,425 A | | 8/1999 | Iwata |
| 6,072,773 A | | 6/2000 | Fichou et al. |
| 6,256,309 B1 | * | 7/2001 | Daley et al. ............ 370/395.43 |
| 6,661,797 B1 | * | 12/2003 | Goel et al. ............. 370/395.21 |
| 6,687,229 B1 | * | 2/2004 | Kataria et al. .............. 370/238 |

* cited by examiner

Primary Examiner—Jeffrey Pwu
(74) Attorney, Agent, or Firm—Browdy and Neimark, PLLC

(57) ABSTRACT

The invention relates to a method and a software product for selecting an optimal path in an ATM network. The proposed method of optimal path selection is applicable to quite a wide class of ATM networks or parts thereof which comprise a plurality of links satisfying the condition that each of the mandatory parameters CDV, MaxCTD and AW has one value symmetric to both directions of a link. Such a plurality of links and value of its parameters may, for example, be obtained after applying a GCAC algorithm to the initial network description, and is represented in the form of a network database. The method comprises obtaining two limitations of end-to end QoS parameters of the path to be selected (MaxCTD$_{QoS}$ and CDV$_{QoS}$), constructing a link cost equation, using the equation, forming a modified network and calculating links' costs thereof, forming one or more data bases of link costs for different weight ratios of members in the link cost equation, and applying a shortest path algorithm to each of the formed data bases to determine one or more conditional paths in these data bases. The shortest path algorithm is capable of selecting a minimal cast path among paths limited by a given number of links to satisfy the limitation CDV$_{QoS}$, and selecting from the conditional paths the one which better satisfies the limitation MaxCTD$_{QoS}$.

11 Claims, 2 Drawing Sheets

QOS-SENSITIVE PATH SELECTION IN ATM NETWORK

FIELD OF THE INVENTION

The invention relates to routing in ATM networks, more particularly to a method for optimized path selection in a specific class of ATM networks.

BACKGROUND OF THE INVENTION

A problem of optimal routing in ATM networks is considered one of the most complex ones, since structure of such networks is characterized by a considerable number of limitations and parameters. In some cases the problem belongs to a so-called type of NP-problems, which are unsolvable.

There is a widely known system PNNI—Private Network-Network Interface—intended for use in ATM networks, which describes an accepted way for searching a path in the network according to values of standard parameters and limitations specified by a user for the path, wherein every link in the network is characterized by a number of standard parameters and limitations having respective particular values.

In ATM systems, routing usually comprises the following three steps:

applying to the network a so-called GCAC algorithm for preventing the use in the path of those links, which definitely do not satisfy one of the main parameters for limitations stated by the user (for example, the available Bandwidth), then performing the procedure of path selection to allocate a path candidate, checking whether the selected path candidate satisfies the requirements of the user (which also includes applying a so-called CAC algorithm for checking sufficient bandwidth); if the path does not satisfy the user's requirements, the path selection is repeated to find another path candidate, up to allocating a stable path, It should be noted that the step of GCAC is not mandatory, and its sorting functions may be performed after selecting the path candidate, etc.

The present invention relates to the procedure of path selection per se. Accuracy and optimality of the path selection were always considered important in the art of telecommunication. In the modem telecommunication world, transport networks become the most critical areas from the point of selecting the optimal path, since paths in such networks are usually selected for heavy traffic streams and for considerable time. It is therefore understood that in case when the telecommunication path selection determines both the quality conditions and the expenses for a long term, the selection result is highly responsible.

U.S. Pat. No. 5,933,421 describes a general algorithm of routing in ATM networks, including steps of updating a Topological Data Base, deleting non-applicable links after receiving a Reject for Setup, repeated path selection after receiving the Reject(s), etc. The patent mentions also a Path Selection method as being a component part of the general algorithm.

For the Path Selection, the following so-called QoS parameters are used—Available Cell Rate (ACR), Cell Transfer Delay (CTD), Cell Delay Variation (CDV), Cell loss Ratio (CLR). It should be noted that the mentioned parameters do not exactly correspond to definitions accepted in ATM.

According to the technique of U.S. Pat. No. 5,933,425, if a number of QoS parameters are specified by the connection request, the optimal path does not satisfy all of the requested QoS values simultaneously, since the attempt to do it would be an insolvable NP-problem. Therefore, the path selection in U.S. Pat. No. 5,933,425 is performed in a number of steps. In one or more variations of the method, a so-called Administrative Weight (AW) is used as a QoS parameter to calculate a sum of link costs for each of possible paths to destination in order to find an optimum path which gives a minimum value of the sums. This optimum path is further selected as a candidate using a QoS parameter requested by a user. Any selected QoS parameter is set into its evaluation function, or into a so-called link cost formula. The decision is made by steps, whether the path meets all the other requested QoS values. If any of the QoS requested parameters is not met, the path as reselected. However, the Path Selection technique, based on a single QoS parameter, requires a lot of computation time and, besides it, cannot always guarantee a successful path search. For example, a situation may be encountered where the required path exists but cannot be found using the described technique. Such a situation is typical for a network, in which some links have low values of CTD and large values of CDV while other links have large values of CTD and low values of CDV. It means that selection of a single parameter at each step leads to underestimation of other parameters' influence, which often cannot be corrected at the next step while definitely prolonging the path selection procedures.

To the best of the Inventor's knowledge, no methods of routing in ATM networks have been proposed to date which resolve the above-mentioned problem.

OBJECT OF THE INVENTION

It is therefore an object of the invention to provide a method of optimal path selection for routing in Asynchronous Transfer Mode (ATM) network, at least for a class of such networks satisfying particular assumptions, and for a particular complexity of the users' connection requests.

SUMMARY OF THE INVENTION

Before starting the description, some terms and conditions are to be clarified.

Following are the Quality of Service (QoS) connection requirements which, according to the standard (ATM forum, Traffic Management Specification, Version 4.0, AF-TM-0056.000, April 1996) can be posed by a user in the user's connection request, i.e., the QoS limitations to a path between a source node and a destination node, through which the telecommunication service will be maintained:

1) Forward $CDV_{QoS}$; 2) Backward $CDV_{QoS}$; 3) MaxCT-$D_{QoS}$;

Where:

$CDV_{QoS}$ is end-to-lend Cell Delay Variation of the selected path, usually this parameter is defined for the forward and for the backward direction and may have different values;

$MaxCTD_{QoS}$ is end-to-end Maximum Cell Transfer Delay of the selected path.

Below is a group of Link State Parameters characterizing a single link between two nodes, and serving as initial data for a path selection algorithm. The following list of the parameters, with their values, may be obtained, for example, upon applying the GCAC algorithm to the ATM network initial topology:

a) CDV—Cell delay Variation for the link;

b) MaxCTD—Maximum Cell Transfer Delay for the link;

c) AW—Administrative Weight of the link, designates a value reflecting one or more of various physical and administrative factors such as the link length, cost, etc.;
d) AvCR—Available Cell Rate via the link;
e) MCR—Maximal Cell Rate via the link;
f) NEC—Number of Established Connections via the link.

Each of the above Link State Parameters is stated to be symmetric for both directions of a particular bi-directional link. The first two parameters (a,b) will be called delay-oriented parameters, or D-parameters, in the fame of the present application. The remaining parameters will be called non-D parameters. The first three parameters (a,b,c) will be considered mandatory parameters for the inventive method, while the remaining parameters are optional parameters for path selection.

ATM networks or parts thereof comprising a plurality of links which satisfy the initial condition that each of the mandatory parameters CDV, MaxCTD and AW has one value symmetric to both directions of a link, form a class of networks to which the proposed method of optimal path selection is applicable. Such a plurality of links and values of its parameters may, for example, be obtained after applying a GCAC algorithm to the initial network description. It should be noted that such a class is quite wide.

There is provided a method for selecting an optimal path in an ATM network having a plurality of links where, for each of the links, Link State Parameters are defined including a group of non-D parameters comprising at least AW, and two D-parameters MaxCTD and CDV, (said ATM network being represented in the form of a network database) the method being performed by steps of:

receiving a user's request for selecting a path between a source point and a destination point in said network, obtaining from the user's request two limitations of end-to end QoS parameters of the path to be selected, one of the limitations being $MaxCTD_{QoS}$ and the other limitation being $CDV_{QoS}$, normalizing the D-parameter CDV by modifying the ATM network so as to make CDV constant for all links of the modified network (thereby creating a modified network database), constructing a link cost equation comprising a first member reflecting influence of the D-parameter MaxCTD on the cost, and a second member reflecting influence of the group of non-D parameters on the cost, the members being taken with respective relative importance weights, based on said equation, calculating links' costs of the modified network for one or more values of a ratio between the relative importance weight of the first member and that of the second member, and forming a data base of link costs (cost DB) for each of said one or more ratio values;

applying a shortest path algorithm to each of the formed cost DBs to determine one or more conditional shortest paths for the respective one or more cost DBs, said algorithm being capable of selecting a minimal cost path among paths limited by a given number of links to satisfy said limitation $CDV_{QoS}$;

calculating one or more cumulative values $MaxCTD_{cum}$ of the D-parameter MaxCTD for said one or more determined conditional paths, respectively, and judging about the optimal path based on comparing said one or more cumulative values $MaxCTD_{cum}$ with the limitation $MaxCTD_{QoS}$.

For normalizing the D-parameter CDV, the following steps can be performed:

selecting a value of minCDV such, that values of CDV parameter of the network link could substantially be represented as respective k-fold multiples of said minCDV, where k is integer;

building a modified network by symbolically replacing each of the links, having CDV value of k*minCDV where k>1, with "k" fictitious component links each having the CDV value equal to said minCDV so, that the CDV value of each replaced link be equal to a cumulative value of corresponding parameter values of the "k" fictitious component links;

assigning to said "k" fictitious links values of remaining link state parameters in a manner providing equivalence of said "k" links to the replaced link from the point of each of the link state parameters.

To construct the link cost equation comprising a first member reflecting influence of the D-parameter MaxCTD on the cost, and a second member reflecting influence of the group of non-D parameters on the cost, it is preferred to define a relative importance weight for the member of D-parameters as R, and that for the member of non-D parameters as (1−R).

For calculating links' costs of the modified network for one or more said ratio values, there is proposed a step of sequentially selecting one or more R values in the range $0 \leq R \leq 1$ and calculating for each of them link costs of all links of the modified network using said link cost equation, and then forming a data base of link costs for each of said one or more R values.

The step of applying a shortest path algorithm to each of the formed data bases to determine a conditional shortest path preferably comprises:

applying a Bellman-Ford-type algorithm to each of the data bases (being the modified network represented by a plurality of its links' costs), for defining said conditional shortest path between the source point and the destination point, while limiting a number of links in said path to $H=CDV_{QoS}/minCDV$, thereby obtaining the conditional shortest path both having a minimal sum of the cost values of links forming said path, and satisfying the end-to-end limitation $CDV_{QoS}$.

For calculating the cumulative value $MaxCTD_{cum}$ of the D-parameter MaxCTD for each of said conditional shortest paths, MaxCTD) values of the links forming said path are summed.

The judgement about the optimal path, based on comparing said one or more cumulative values $MaxCTD_{cum}$ with the limitation $MaxCTD_{QoS}$, can be made as follows:

if exists a particular value R* of the relative impotence weight R at which the determined conditional shortest path has the cumulative value $MaxCTD_{cum}$ equal to, or smaller but substantially close to said $MaxCTD_{QoS}$ limitation, said conditional shortest path is considered the optimal path.

According to another aspect of the invention, there is also provided a computer software product for selecting an optimal path in an ATM network of the kind specified above, the product comprising a computer-readable medium in which program instructions are stored, which instructions, when read by a computer, cause the computer to perform steps of the above-described method.

Further aspects and details of the proposed invention will be disclosed as the description proceeds.

BRIEF DESCRIPTION OF THE DRAWINGS

The invention will further be described in detail with reference to the following non-limiting drawings in which.

DETAILED DESCRIPTION OF THE PREFERRED EMBODIMENTS

Figure 1:
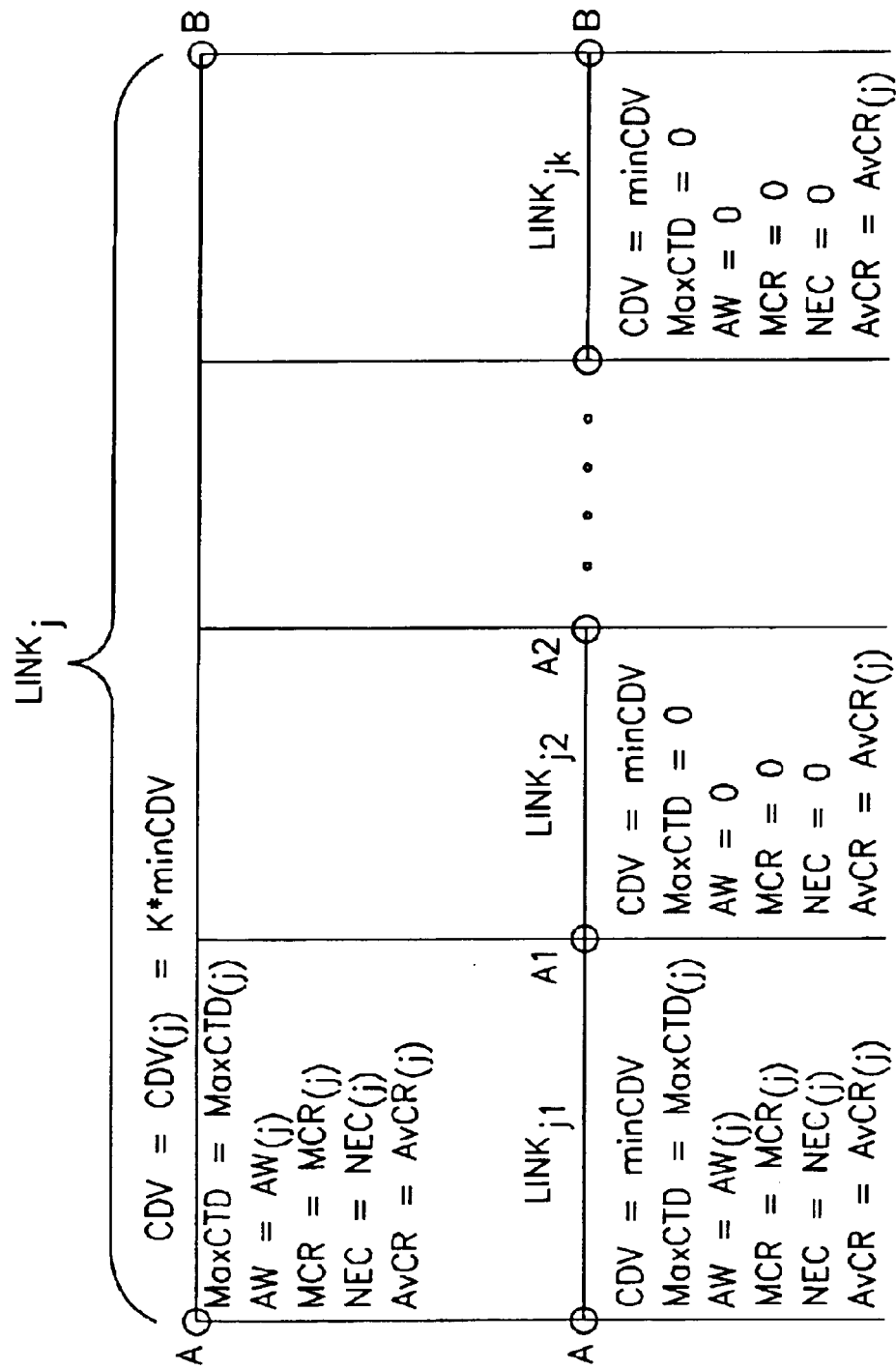
FIG. 1 schematically illustrates dividing a real link having its non-D and D-parameters, into a number of fictitious links.

Below, more comprehensive and detailed explanations of the above method are given.

Usually in practice, all links of the initial ATM network which participate in the procedure of the path selection, are admitted to his procedure by a GCAC algorithm—i.e., they are previously filtered for not to include so-called bottlenecks due to any factor, for example due to their bandwidth property.

Also, the user's request may initially comprise two end-to-end limitations being $CDV_{QoS\text{-}forward}$ and $CDV_{QoS\text{-}backward}$. To satisfy both of these requirements, the method comprises obtaining said $CDV_{QoS}$ from the user's request, where $CDV_{QoS}=\min(CDV_{QoS\text{-}forward}, CDV_{QoS\text{-}backward})$.

The step of building the modified network should be understood as conversion of the given plurality of links, where each link has two real parameters with arbitrary values, into an extended plurality of real and fictitious links where each link also has two real D-parameters, but one of them is constant for said modified plurality (CDV-minCDV). The other D-parameter (maxCTD) has its value on any real link, and if a particular real link is divided into a number of fictitious links, the first fictitious link of the real link may be stated to have the maxCTD value equal to that of the real link, so the remaining fictitious links will have maxCTD=0. Other parameters' values are also arranged in all the fictitious links to adequately represent the replaced link.

For calculating the link cost of each link in the modified network, the Inventor proposed to use coefficients which are called relative importance weights in this application. These weights are introduced to alleviate allocation of compromise solutions where the required path should satisfy multiple requirements and limitations. As can be understood from the above method definition, the importance weight R designates a relative Importance of Quality of Service parameters for the path selection.

It is understood that AW and other non-D parameters are routinely desired to be minimal in any path selection procedure. Intuitively, if a path having a minimal cumulative administrative weight ($AW_{cum}$) does not satisfy any of the quality of service (QoS) limitations, one should search for a path having a less attractive (higher) $AW_{cum}$, but better QoS end-to-end characteristics. The problem is in that the user's request comprises more than one QoS limitations which do not correlate, and in that the requirement of minimal possible $AW_{cum}$ (and other like parameters) should still be complied with when searching a path satisfying the QoS limitations. To resolve that, the proposed cost equation is built with coefficients (importance weights) to balance importance of the so-called D-parameters and non-D parameters of links, which respectively affect QoS and other (AW-like) characteristics of a path.

When applying the shortest path algorithm of the Bellman&Ford-type for determining the shortest path, a distance from the source point can be limited to a maximal number of links (which is characteristic for Bellman-Ford algorithm, and not to others, say for Dijkstra algorithm). By limiting the number of links, we actually introduce the limitation of $CDV_{QoS}$ into the shortest path to be selected. Indeed, to satisfy the CDV end-to-end constraint we can therefore satisfy a constraint of links since each our link has its CDV value=CDVmin. So, the selected path should have full number of links $H \leq CDV_{QoS}/\min CDV$, and among such paths we search for one having the minimal cost. Without applying the steps proposed by the inventor, i.e. 1) normalizing one of the parameters (CDV) by making it constant for all the links, 2) introducing relative importance weights into the link cost equation, and 3) applying a specific shortest path algorithm capable of analyzing paths with a given length (number of hops), the problem posed in the invention would have no solution, i.e., would belong to so-called NP-problems.

FIG. 1 illustrates how a real link in a real ATM network can be represented for the proposed method, to allow further selection of the shortest optimal path.

A link between nodes A and B is marked "link j" and can be characterized by a number of parameters having their values, which are listed under the path. D-parameters of the link, indicated in this drawing, are CDV and MaxCTD being mandatory for ATM networks. There is a group of four non-D parameters: AW, MCR, AvCR and NEC. Parameters CDV, MaxCTD and AW are mandatory parameters, while others are optional parameters and may be either absent or replaced by differently formulated optional ones.

According to the invention, the real link "j" (and at least some of other links in the given ATM network) is symbolically divided into a number of fictitious links to normalize one of the mandatory parameters (CDV), i.e., to obtain a network where all links have one and the same value CDVmin of the parameter CDV. In this example, the real link "j" is divided into "k" component fictitious links. In the drawing, "k" fictitious links each have CDV=CDVmin, and only the first fictitious link. "j1" has the remaining parameters equal to those of the real link. All the remaining fictitious links, except for AvCR, have zero values of all the parameters except for the CDV. Value of the AvCR parameter in each fictitious link (j1 . . . jk) is equal to the AvCR value of the real link (j). Actually, distribution of the remaining parameters' values among these links may be different, but the proposed scheme is the simplest. The only requirement is that effect of the value of each defined parameter of the real link be respectively equivalent to effect made by values of this parameter of all fictitious links replacing the real link.

Using the proposed conversion, we normalize and thus "remove" one parameter (CDV) from the group of variable D-parameters, thus simplifying the task. It will further be demonstrated that we also avoid a separate procedure of checking a conditional shortest path from the point of limitation $CDV_{QoS}$, since the normalized CDV parameter is taken into account when selecting such a path.

Figure 2:
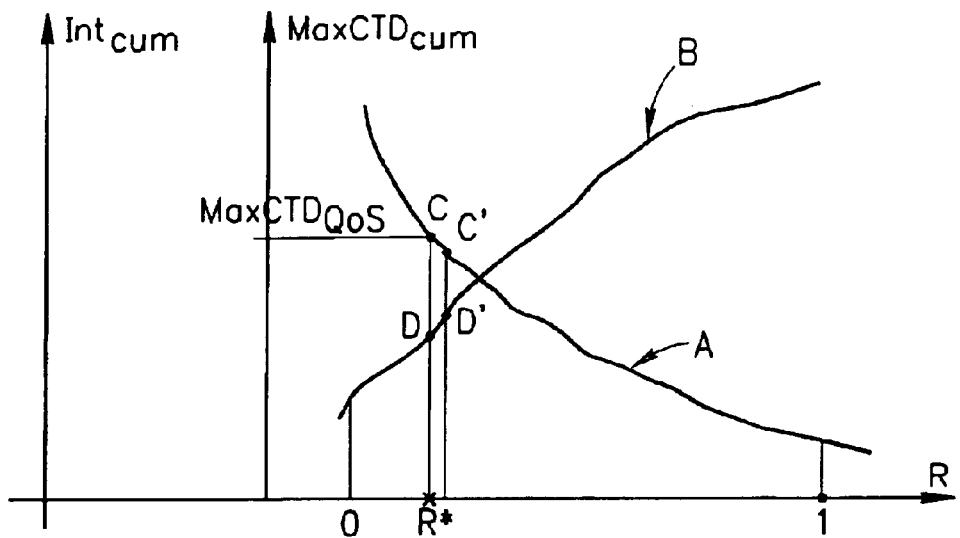
FIG. 2 presents a graphical aid for understanding the way of utilizing the cost equation and the way of decision making, to select the opal path, based on selection the importance weights in the cost equation.

FIG. 2 illustrates two graphs, which will further be explained using the following mathematical expressions. In this example, for calculating cost of link [i] we use a weighted equation:

$$COST[i]=R\{MaxCTD[i]/MaxCTD_{QoS}\}++(1-R)\{Imp.AW(AW[i]/maxAW[m]++Imp.DIV(NEC[i]/maxNEC[m]++Imp.BW([MCR[i]/(AvCR[i])-1]/max(MCR[m]/AvCR[m])-1])\},$$

where:
i—a link of the modified network
m=(1, . . . M)—designate links admitted (say, by GCAC) to the procedure of the path selection; for example maxAW [m] is the maximal known value of AW among all the M links.

R—a relative importance weight of D-parameters of a link (i.e., the only remaining parameter MaxCTD) in the procedure of path selection, reflecting relative importance of these parameters for the selected path:
$1 \geq R \geq 0$;
(1−R)—a relative importance weight of non-D link parameters;
$1 \geq (1−R) \geq 0$;
Imp.AW—is a predetermined (or expert) importance weight of the parameter AW, reflecting relative importance thereof among other non-D parameters. When AW is the only non-D parameter of the link, Imp.AW=1.
Imp.BW—importance weight of the "bandwidth load balancing factor"; (if for a link MCR/AvCR is close to 1, the link is "good", and when it is >>1, the link is a "bottleneck" from the point of bandwidth;
Imp.DIV—importance weight of the "diversity load balancing factor" which reflects the NEC parameter.
The following exemplary values of the last three expert coeffcients (importance weights) can be determined by simulation: Imp.AW=0.85; Imp.BW=0.1.; and Imp.DIV=0.05.

Cost calculation for each link (real or fictitious) of the modified network, is started by selecting an initial ratio of importance weights between the D and non-D parameters. Suppose R is minimal (=0) i.e., we are not interested whether links in the selected path have high or low value of the D-parameter MaxCTD.

After the variable R is selected and costs of the links are calculated, the Bellman-Ford algorithm selects the shortest path comprising "n" links resulting in the minimal total cost of the path and satisfying the limitation of $CDV_{QoS}$. Now we may find two left-side points of two curves A and B shown in FIG. 2. Curve A presents a cumulative value $MaxCTD_{cum}$ over the defined shortest path. Curve B presents the cumulative value of the member of the cost equation, having the importance weight (1−R), and marked $Int_{cum}$.

Curves A and B are functions of argument R, and look as follows:

$$A = \text{Max}CTD_{cum}(R) = \sum_{i=1}^{n} \text{Max}CTD\ [i]$$

$$B = Int_{cum}(R) = \sum_{i=1}^{n} \{Imp \cdot AW(AW_i / \max AW[m])\} +$$

$$Imp \cdot DIV(NEC[i] / \max\{NEC[m]\}) +$$

$$Imp \cdot BW([MCR[i] / AvCR[i] - 1] / \max[MCR[m] / AvCR[m] - 1])\}$$

As can be seen, if optional non-D parameters of the above equation are absent or negligible, function B reflects influence on the link cost of the AW parameter only.

It has been proposed and further proven by the Inventor that function A is a monotonous non-increase function of the variable R, and function B is a monotonous non-decrease function of the same variable R. In view of the above finding, and keeping in mind that the maximal value of the QoS limitation $MaxCTD_{QoS}$ is set in the user's request, (see the required $MaxCTD_{QoS}$ value marked in FIG. 2 on the vertical axis), the task is to allocate such a value of the argument R, at which function A $MaxCTD_{QoS}$, while function B is minimal. The determined value of the argument R* will define the particular ratio of importance (weights) between the D-parameters and non-D-parameters of a link at which the selected shortest path is optimal.

The problem can be solved in a number of ways.

Option 1: Performing two rounds of the calculation to determine $MaxCTD_{cum}$: a first round for the variable R=0, and a second round for R=1. Thus two edge points of curve A are obtained. If the first edge point gives $A \leq MaxCTD_{QoS}$, it is already the answer, i.e. there is no need to look for another ratio of weights, since even the less strict ratio satisfies the limitation of the path parameter $MaxCTD_{QoS}$.
If the second round gives $A > MaxCTD_{QoS}$, the path with the required limitation does not exist.
If only the second edge point gives $A \leq maxCTD_{path}$, procedure should be continued. Using the Inventor's finding concerning the character of curves A and B in FIG. 2, and performing additional rounds of calculations for a number of R values (0<R<1), allows allocation of such a value of function A which would be equal to, or smaller but sufficiently close to the required $MaxCTD_{QoS}$. Such a point (see point C or point C' on curve A in the drawing) will automatically reveal a point on curve B (see point D or D') which is as low as possible for the required $MaxCTD_{QoS}$, and therefore enables satisfying the requirements of the optimal path.

Option 2: A computational method, where the same two rounds of calculations are preferably performed to define whether a path satisfying the limitations in the user's request exists in the network. Upon these two rounds are accomplished, a number of different values of the variable R in the range 0<R<1 are selected, and a pair of readings of two curves A and B are calculated for each of the selected values of the variable R. Upon achieving a predetermined number of attempts (selected values) or upon expiration of a predetermined time, computer selects from the calculated pairs of readings such a reading for which $A \leq MaxCTD_{QoS}$, and B is minimal among those calculated.

Figure 3:
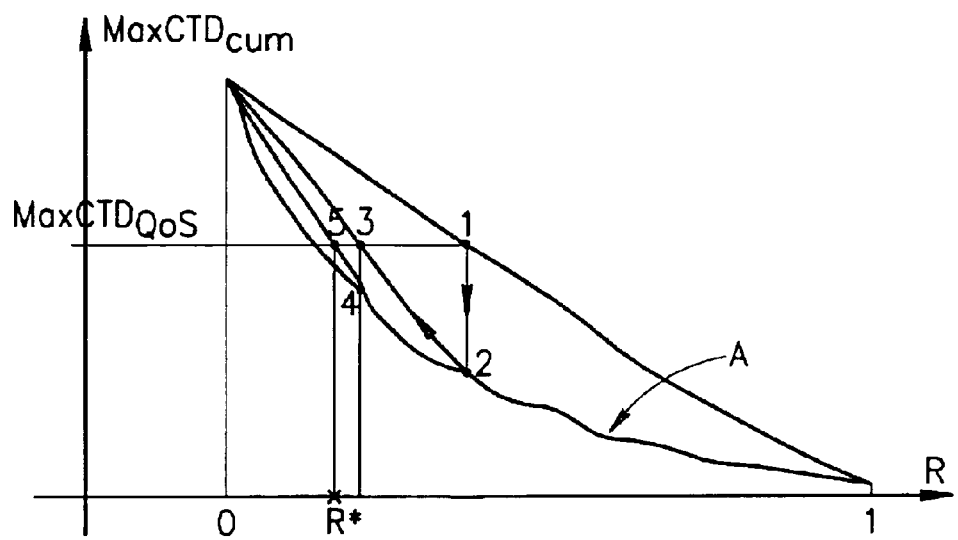
FIG. 3 illustrates one of versions of the inventive method explaining a quick way of finding the ratio of importance weights, suitable for searching the optimal path.

Option 3 (see FIG. 3): Value R* of the variable R suitable for the optimal path, can be found by applying to the curve A (without constructing it), a method of secants. First, the same two rounds of calculation must be performed to obtain the left edge of curve A and the right edge thereof, and to determine whether a path satisfying the limitations in the user's request exists in the network. If yes, values of R are selected step by step according to the secants' method, as shown in FIG. 3, thereby approaching to a specific point on curve A, and simultaneously to the point R* on the axis of variable R which defines the optimal value of the importance ratio between the D-parameters and non-D parameters suitable for the optimal path.

What is claimed is:

1. A method for selecting an optimal path in an Asychronous Transfer Mode (ATM) network having a plurality of links where, for each of the links, Link State Parameters are defined including a group of non delay-oriented (non-D) parameters comprising at least Administrative Weight (AW) and two delay oriented parameters (D-parameters) being Maximum Cell Transfer Delay (MaxCTD) and Cell Delay Variation (CDV), the method being performed by the following steps:

a) obtaining two limitations of end-to end quality of service (QoS) parameters of a path to be selected between a source point and a destination point in said network, one of the limitations being Maximum Cell Transfer Delay ($MaxCTD_{QoS}$) and the other limitation being $CDV_{QoS}$, b) normalizing a D-parameter CDV by virtually modifying the ATM network so as to make CDV constant for all links of the modified network, by selecting a value of minCDV such, that values of CDV parameter of the network links are substantially represented as respective k-fold multiples of said minCDV, where k is integer;

building a modified network by symbolically replacing each of the links, having CDV value of k*minCDV where k>1, with "k" fictitious component links each having the CDV value equal to said minCDV so, that the CDV value of each replaced link be equal to a cumulative value of corresponding CDV values of the "k" fictitious component links;

assigning to said "k" fictitious links values of remaining Link State Parameters in a manner providing equivalence of said "k" links to the replaced link from the point of each of the link state parameters;

c) constructing a link cost equation comprising a first member reflecting influence of a D-parameter MaxCTD on the cost, and a second member reflecting influence of the group of non-D parameters on the cost, the members being taken with respective relative importance weights, wherein a relative importance weight of the member associated with said D-parameter MaxCTD is defined as R, and a relative importance weight of the member associated with the non-D parameters is defined as (1–R);

d) based on said link cost equation, calculating links' costs of the modified network, for one or more values of a ratio between the relative importance weight of the first member and that of the second member, and forming a data base of link costs for each of said one or more ratio values;

e) applying a Bellman-Ford-type shortest path algorithm to each of the formed data bases to determine one or more conditional paths for the respective one or more data bases, said algorithm being capable of selecting a minimal cost path among paths limited by a given number of links to satisfy said limitation $CDV_{QoS}$;

f) calculating one or more cumulative values $MaxCTD_{cum}$ of the D-parameter MaxCTD for said respective one or more determined conditional paths, and g) making a judgment about the optimal path, based on comparing said one or more cumulative values $MaxCTD_{cum}$ with the limitation $MaxCTD_{QoS}$, said optimal path being such of said one or more determined conditional paths, satisfying both the limitation $CDV_{QoS}$ and the limitation $MaxCTD_{QoS}$.

2. The method according to claim 1, wherein the step of calculating links' costs of the modified network further comprises:

sequentially selecting one or more variable values R in the range 0<R<1 and calculating for each of them link costs of all the links of the modified network using said link cost equation, and forming a data base of link costs for each of said one or more R values.

3. The method according to claim 1, wherein the step (e) comprises:

applying the Bellman-Ford-type shortest path algorithm to each of the data bases, for defining said conditional shortest path between the source point and the destination point, while limiting a number of links in said path to $H=CDV_{QoS}/minCDV$, thereby obtaining the conditional shortest path both having a minimal sum of the cost values of links forming said path, and satisfying the end-to-end limitation $CDV_{QoS}$.

4. The method according to claim 1, wherein the step of calculating the cumulative value $MaxCTD_{cum}$ of the D-parameter MaxCTD for each of said conditional shortest paths comprises summing MaxCTD values of the links forming said path.

5. The method according to claim 1, wherein the judgement about the optimal path is performed by comparing said one or more cumulative values $MaxCTD_{cum}$ with the limitation $MaxCTD_{QoS}$, checking whether there exists a particular value R* of the relative importance weight R at which the determined conditional shortest path has the cumulative value $MaxCTD_{cum}$ equal to, or smaller but substantially close to said $MaxCTD_{QoS}$ limitation, if yes, the conditional shortest path determined for said R* is considered the optimal path, if no, the optimal path does not exist for said limitations.

6. The method according to claim 1, comprising choosing an initial value of R in the range 0<R<1, thereby selecting a ratio between said relative importance weights;

determining the cumulative value $MaxCTD_{cum}$ of the conditional shortest path for the selected ratio, if the cumulative value $MaxCTD_{cum}$ does not exceed the required limitation $MaxCTD_{QoS}$, decreasing the selected value of R within said range, if the cumulative value $MaxCTD_{cum}$ exceeds the required limitation $MaxCTD_{QoS}$, increasing the selected value of R within said range, repeating the step of determining said $MaxCTD_{cum}$ up to either obtaining, at said particular value R*, the conditional path being said optimal path, or concluding that the optimal path does not exist.

7. The method according to claim 1, wherein values of R are selected in the following order:

selecting R=0;

if the cumulative value $MaxCTD_{cum}$ does not exceed the required limitation $MaxCTD_{QoS}$, considering the defined conditional shortest path to be optimal, if the cumulative value $MaxCTD_{cum}$ exceeds the required limitation $MaxCTD_{QoS}$, selecting R=1, and determining the cumulative value of $MaxCTD_{cum}$ for R=1;

if the cumulative value $MaxCTD_{path}$ still exceeds the required $maxCTD_{path}$, the optimal path does not exist;

if the cumulative value $MaxCTD_{cum}$ for R=1 does not exceed the required limitation $MaxCTD_{QoS}$, selecting a number of R values in the range 0<R<1, up to obtaining, at a particular value R*, the cumulative value $MaxCTD_{cum}$ equal to, or smaller but substantially close to said required $maxCTD_{QoS}$ parameter, thereby considering the conditional shortest path defined for said R* to be the optimal path.

8. The method according to claim 1, wherein said values of a ratio are selected by applying a method of secants to a function $$MaxCTD_{cum} = f(R),$$

wherein said function being a non-increasing monotonous function.

9. A method for optimized path selection in an Asynchronous Transfer Mode (ATM) network having a plurality of links where, for each of the links, Link State Parameters are defined including a group of non delay-oriented (non-D) parameters comprising at least Administrative Weight (AW), and including two delay oriented parameters (D-parameters) Maximum Cell Transfer Delay (MaxCTD) and Cell Delay Variation (CDV), the method comprises steps of:

obtaining two limitations of end-to end quality of service (QoS) parameters of the path to be selected between a source point and a destination point in said network, one of the limitations being Maximum Cell Transfer Delay (MaxCTD$_{QoS}$) and the other limitation being CDV$_{QoS}$, selecting a value of minCDV such, that values of CDV parameter of the network links are substantially represented as respective k-fold multiples of said minCDV, where k is integer;

building a virtual modified network from said network by virtually replacing each of the links, having CDV value of k*minCDV where k>1, with "k" fictitious component links each having the CDV value equal to said minCDV so, that the CDV value of each replaced link be equal to a cumulative value of corresponding CDV values of the "k" fictitious component links;

assigning to said "k" fictitious links values of remaining link state parameters in a manner providing equivalence of said "k" links to the replaced link from the point of each of the Link State Parameters;

defining an importance weight for the D-parameters as R, and that for the non-D parameters as (1−R);

sequentially selecting one or more R values in the range 0<R<1 and determining for each of them a cumulative value MaxCTD$_{cum}$ of a conditional shortest path in order to obtain, at a particular value R* of the importance weight R, the cumulative value MaxCTD$_{cum}$ equal to, or smaller but substantially close to said MaxCTD$_{QoS}$ limitation;

wherein the step of determining the cumulative value MaxCTD$_{cum}$ of the conditional shortest path comprises, for each selected value of R:

calculating a cost for each link of said modified network by using a weighed equation comprising a first member, with importance weight R, reflecting influence of the D-parameter MaxCTD on the cost, and a second member, with importance weight (1−R), reflecting influence of said group of the non-D parameters on the cost;

applying a Bellman-Ford-type algorithm to the modified network represented by a plurality of its links' costs, for defining said conditional shortest path between the source point and the destination point, while limiting a number of links in said path to H=CDV$_{QoS}$/minCDV, thereby obtaining the conditional shortest path both having a minimal sum of the cost values of links forming said path, and satisfying the end-to-end limitation CDV$_{QoS}$;

calculating said cumulative value MaxCTD$_{cum}$ of the conditional shortest path, by summing maxCTD values of the links forming said path;

if said particular value R* exists, considering the corresponding to it said conditional shortest path to be the optimal path.

10. A computer software product for selecting an optimal path in an Asychronous Transfer Mode (ATM) network having a plurality of links where, for each of the links, Link State Parameters are defined including a group of non delay-oriented (non-D) parameters comprising:

at least Administrative Weight (AW), and two delay oriented parameters (D-parameters) being Maximum Cell Transfer Delay (MaxCTD) and Cell Delay Variation (CDV), and said ATM network being represented in the form of a network database;

the product comprising a computer-readable medium in which program instructions are stored, which instructions, when read by a computer, cause the computer to:

obtain, from a request on selecting a path between a source point and a destination point in said network, two limitations of end-to end quality of service QoS parameters of the path to be selected, one of the limitations being MaxCTD$_{QoS}$ and the other limitation being CDV$_{QoS}$, normalize the D-parameter CDV by modifying the ATM network so as to make CDV constant for all links of the modified network, thereby forming a modified network database;

activate a subroutine of a link cost equation comprising a first member reflecting influence of the D-parameter MaxCTD on the cost, and a second member reflecting influence of the group of non-D parameters on the cost, the members being taken with respective relative importance weights, using said link cost equation subroutine, calculate links' costs of the modified network, for one or more values of a ratio between the relative importance weight of the first member and that of the second member, and form a data base of link costs (cost DB) for each of said one or more ratio values;

apply a subroutine of a shortest path algorithm to each of the formed cost DBs to determine one or more conditional paths for said one or more cost DBs respectively, said algorithm being capable of selecting a minimal cost path among paths limited by a given number of links to satisfy said limitation CDV$_{QoS}$;

calculate one or more cumulative values MaxCTD$_{cum}$ of the D-parameter MaxCTD for said respective one or more determined conditional paths, and make a judgment about the optimal path, based on comparing said one or more cumulative values MaxCTD$_{cum}$ with the limitation MaxCTD$_{QoS}$.

11. A method for selecting an optimal path in an Asychronous Transfer Mode (ATM) network having a plurality of links where, for each of the links, Link State Parameters are defined at least two delay oriented parameters (D-parameters) being Maximum Cell Transfer Delay (MaxCTD) and Cell Delay Variation (CDV), the method comprising the following steps:

a) obtaining two limitations of end-to end quality of service (QoS) parameters of the path to be selected in the network between a source point and a destination point, one of the limitations being MaxCTD$_{QoS}$ and the other limitation being CDV$_{QoS}$, b) normalizing a D-parameter CDV by virtually modifying the ATM network so as to make CDV constant for all links of the modified network, by selecting a value of minCDV such, that values of CDV parameter of the network links are substantially represented as respective k-fold multiples of said minCDV, where k is integer;

building a modified network by virtually replacing each of the links, having CDV value of k*minCDV where k>1, with "k" fictitious component links each having the CDV value equal to said minCDV so, that the CDV value of each replaced link be equal to a cumulative value of corresponding CDV values of the "k" fictitious component links;

assigning to said "k" fictitious links values of remaining Link State Parameters in a manner providing equivalence of said "k" links to the replaced link from the point of each of the link state parameters;

c) constructing at least one link cost equation reflecting influence of a D-parameter MaxCTD on the cost, d) based on said at least one link cost equation, calculating links' costs of the modified network, and forming one or more data bases of link costs;

e) applying a Bellman-Ford-type shortest path algorithm to each of the one or more formed data bases to determine one or more conditional paths for the respective one or more data bases, said algorithm being capable of selecting a minimal cost path among paths limited by a given number of links to satisfy said limitation $CDV_{QoS}$;

f) calculating one or more cumulative values $MaxCTD_{cum}$ of the D-parameter MaxCTD for said respective one or more determined conditional paths, and g) making a judgment about the optimal path, based on comparing said one or more cumulative values $MaxCTD_{cum}$ with the limitation $MaxCTD_{QoS}$, said optimal path being such of said one or more determined conditional paths, satisfying both the limitation $CDV_{QoS}$ and the limitation $MaxCTD_{QoS}$.

* * * * *